(12) United States Patent
Dainez et al.

(10) Patent No.: US 6,346,785 B1
(45) Date of Patent: Feb. 12, 2002

(54) DRIVING CONTROL SYSTEM FOR ELECTRIC MOTORS

(75) Inventors: Paulo Sérgio Dainez; Marcos Guilherme Schwarz, both of Joinville-SC (BR)

(73) Assignee: Empresa Brasileira de Compressores S./A -Embraco, Joinville-SC (BR)

( * ) Notice: Subject to any disclaimer, the term of this patent is extended or adjusted under 35 U.S.C. 154(b) by 0 days.

(21) Appl. No.: 09/462,852

(22) PCT Filed: Nov. 27, 1998

(86) PCT No.: PCT/BR98/00107

§ 371 Date: Jan. 13, 2000

§ 102(e) Date: Jan. 13, 2000

(87) PCT Pub. No.: WO99/31794

PCT Pub. Date: Jun. 24, 1999

(30) Foreign Application Priority Data

Dec. 12, 1997 (BR) .......................................... PI9706175

(51) Int. Cl.$^7$ .............................................. H02P 29/00
(52) U.S. Cl. ....................... 318/254; 318/138; 318/439
(58) Field of Search ................................. 318/138, 254, 318/439, 293, 700, 720, 721, 722, 224; 388/907.2

(56) References Cited

U.S. PATENT DOCUMENTS

| | | | |
|---|---|---|---|
| 3,764,855 A | * 10/1973 | Beachley | 317/18 R |
| 4,135,120 A | * 1/1979 | Hoshimi et al. | 318/138 |
| 4,135,235 A | 1/1979 | Baker | 363/43 |
| 4,152,640 A | * 5/1979 | Craig | 324/54 |
| 4,230,976 A | * 10/1980 | Muller | 318/138 |
| 5,406,185 A | 4/1995 | Strunk | 318/767 |
| 5,436,545 A | * 7/1995 | Bahr et al. | 318/727 |
| 5,510,688 A | * 4/1996 | Schwarz | 318/801 |

FOREIGN PATENT DOCUMENTS

EP  0 613 234  8/1994  ............. H02P/6/02

* cited by examiner

*Primary Examiner*—Robert E. Nappi
*Assistant Examiner*—Rita Leykin
(74) *Attorney, Agent, or Firm*—Darby & Darby

(57) ABSTRACT

A driving control system for electric motors, of the type used in refrigeration compressors and including: a power source (20) in direct current having, between positive (21) and negative (22) terminals of equal voltage, a median terminal (25), of null voltage, to which is directly connected a first coil (11) of the electric motor (10); an inverter (30) provided with N−1 commutation arms with opposite ends connected to the power source (20) and each including switch means, each commutation arm being medianly connected to a respective coil; and a control unit (40) operating the switch means, as a function of the signals received from a position sensor means (50), in order to determine to said switch means, in each of a first and a second switching condition thereof, a switching frequency and a switch conduction period, which are defined in order to be effectively applied to the coils a voltage effectively corresponding to the speed and torque required for the motor.

11 Claims, 5 Drawing Sheets

DRIVING CONTROL SYSTEM FOR ELECTRIC MOTORS

FIELD OF THE INVENTION

The present invention refers to a driving control system for an electric motor, particularly a three-phase motor with permanent magnets, of the type used in refrigeration compressors and in which a control unit commands the adequate energization to the motor, as a function of the information received from a position sensor of this system operatively connected to the motor.

BACKGROUND OF THE INVENTION

Brushless direct current three-phase motors are of interest in applications in which reliability and high efficiency are required.

Such motors consist of a stator containing coils, a rotor with permanent magnets, an inverter applying current to the stator coils, a position sensor, which informs on the time and period each coil assembly has to remain energized, and a central control, which processes the information on the current, rotor speed and rotor position and sends command signals to the inverter.

Three-phase motors with permanent magnets of the type used in compressors of refrigeration systems are electronically actuated and usually use inverters with three commutation arms. In this construction, each motor phase is connected between two commutation switches of a respective commutation arm of the inverter, the three arms forming this inverter being connected to the same power source through a rectifying diode bridge connected to a ripple filter capacitor.

In the actuation of motors with permanent magnets, it is necessary to detect the position of the motor, which may be achieved by sensors physically coupled to the rotor (hall effect, optic sensors, etc.) or by observing the voltages induced to the own coils of the motor, as described in Patent PI8805485 (U.S. Pat. No. 4,978,895). Detection of the rotor position allows the control system to select which motor phases will be actuated at each time.

The torque control may be usually effected in two ways: by current hysteresis or by controlling the voltage applied to the motor.

In the current hysteresis control, a median current is applied to the motor phases selected by a controller to be actuated. This current is controlled by a comparator with hysteresis which, when the current reaches a maximum value, turns off the selected switches, turning the latter on when the current reaches a minimum value and thus generating a voltage modulation signal (PWM), also called switching frequency (which is much higher than the rotation of the motor) and which maintains the current around a reference value, which is adjusted to maintain a constant speed. In this control, the voltage modulation signal (PWM), which is generated by the comparator, may vary its switching frequency and its switch conduction period ("duty cycle", ratio between the closed switch period and full switching period) at each time. This type of control reacts more rapidly to load disturbs, but is more complex to be implemented in microcontrolled systems, since it needs at least one A/D converter and a powerful microcontroller.

In the voltage control, a voltage value is applied to the motor phases which have been selected by the controller to be actuated. This voltage is modulated by the voltage modulation signal (PWM), also known as switching frequency, which is generated by a timer and whose average value is adjusted by the control unit, in order to maintain the desired speed. This voltage adjustment is achieved by switching (on and off) the switches selected by the control unit during the period in which the motor phase is fed with voltage from a power source. Thus, in order to vary the average voltage value on the motor, the switch conduction period (ratio between the closed switch period and full switching period) is varied.

If the actual motor rotation speed is lower than the desired speed, the voltage in the motor is increased. If the actual motor rotation speed is higher than the desired speed, the motor voltage is reduced. These variations in the voltage value are adjusted by changing the value of the switch conduction period of the switching frequency: an increase of said value leads to an increase in the voltage value, while a reduction of said value leads to a reduction in the voltage value in the motor. In this control, the voltage modulation signal (PWM) usually has a fixed switching frequency and a switch conduction period, which is adjusted at each turn. This type of control does not react rapidly to sudden load disturbs and is indicated to applications in which the load does not vary suddenly, such as in refrigeration systems. However, it is a simpler control to be implemented in microcontrolled systems.

One of the disadvantages of the prior art construction is the amount of components involved in the inverter, high cost and low reliability. Moreover, it requires a large installation area to place all the components (the six electronic switches and their command, driving and protection circuits).

DISCLOSURE OF THE INVENTION

Thus, it is an objective of the present invention to provide a driving control system for an electric motor, particularly a three-phase motor with permanent magnets of the type used in refrigeration compressors, with a more compact, simpler and low cost construction.

This and other objectives are attained by a driving control system for an electric motor with N coils, N being at least three, including: a power source in direct current; an inverter having commutation arms with the opposite ends connected to the power source, each including switch means, each commutation arm being medianly connected to a respective coil; a position sensor means connected to the coils; and a control unit, operatively connected to the position sensor means and to the switch means, in order to operate the latter as a function of the signals received from the position sensor means. The inverter has N−1 commutation arms and the power source has, between positive and negative terminals of equal voltage, a median terminal, of null voltage, to which is directly connected a first coil, the inverter having a first switching condition of the switch means, in which the first coil is subjected to a null voltage, while two other coils are subjected to a determined voltage value, and a second switching condition of the switch means, in which the first coil and any of said other coils are subjected to a voltage value equivalent to half the determined voltage value and corresponding to the nominal voltage, the control unit determining to the switch means, the latter being in one of the first and second switching conditions, a switching frequency and a switch conduction period, which are defined so that the voltage value which is effectively applied to the coils is that one corresponding to the speed and torque required to the electric motor, independently from the switching condition of the switch means.

BRIEF DESCRIPTION OF THE DRAWINGS

The invention will be described below, with reference to the attached drawings, in which.

BEST MODE OF CARRYING OUT THE INVENTION

Figure 1:
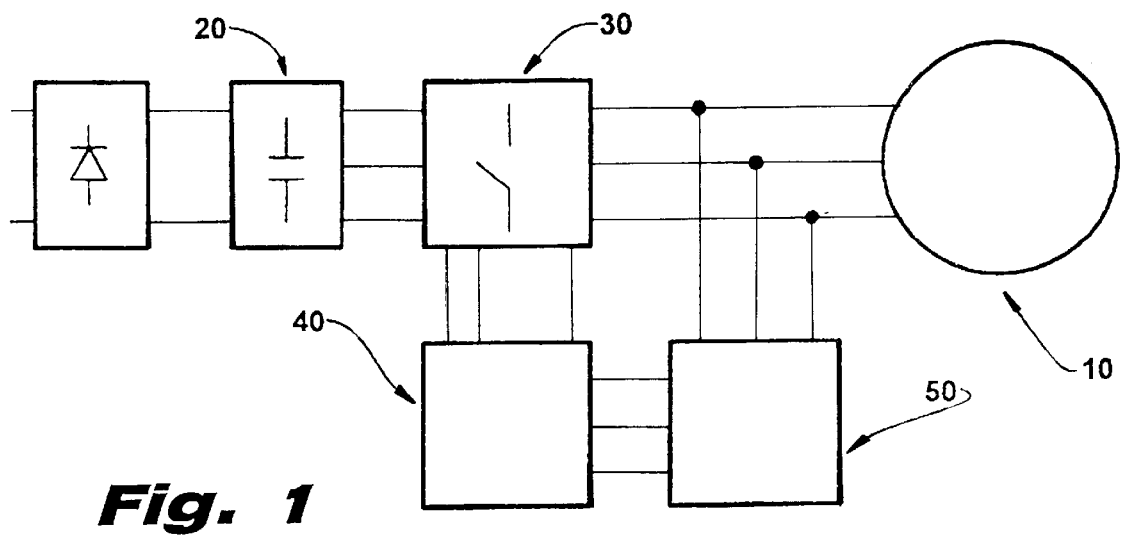
FIG. 1 illustrates, schematically and in a block diagram, an assembly consisting of a motor, an inverter, a control unit, a position sensor means and a power source, constructed according to the present invention.

According to the illustration in FIG. 1, an electric motor 10, which is a three-phase motor having a rotor with permanent magnets, is operatively connected to a power source 20, in direct current, through an inverter 30 supplying electric current and voltage to one of three coils 11, 12 and 13 of the electric motor 10, by selective instruction from a control unit 40, which is operatively connected to the inverter 30 and to a position sensor means 50.

Figure 2:
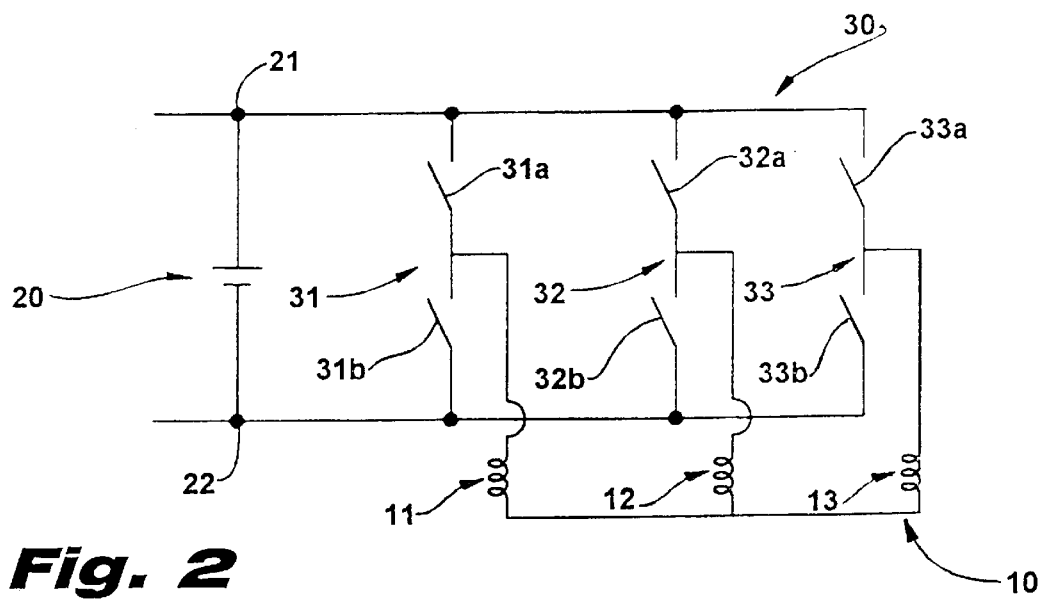
FIG. 2 illustrates, schematically, a construction of a prior art three-phase inverter, having its commutation arms operatively connected to the motor phases.
Figure 3:
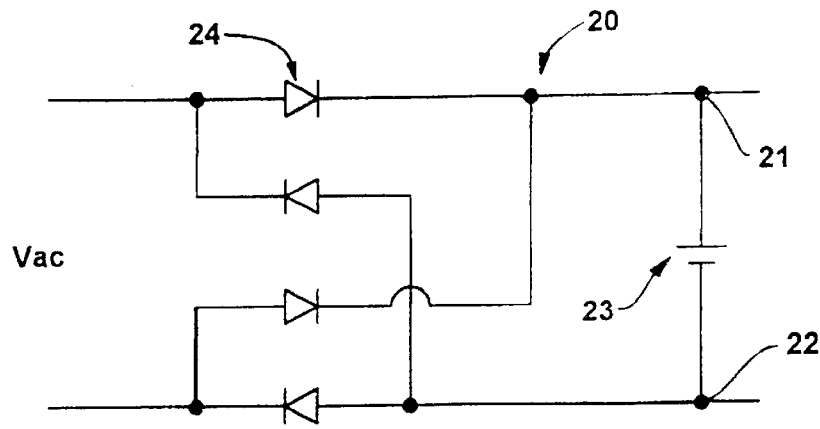
FIG. 3 illustrates, schematically, an embodiment of the DC power source of the prior art inverter.
Figure 4:
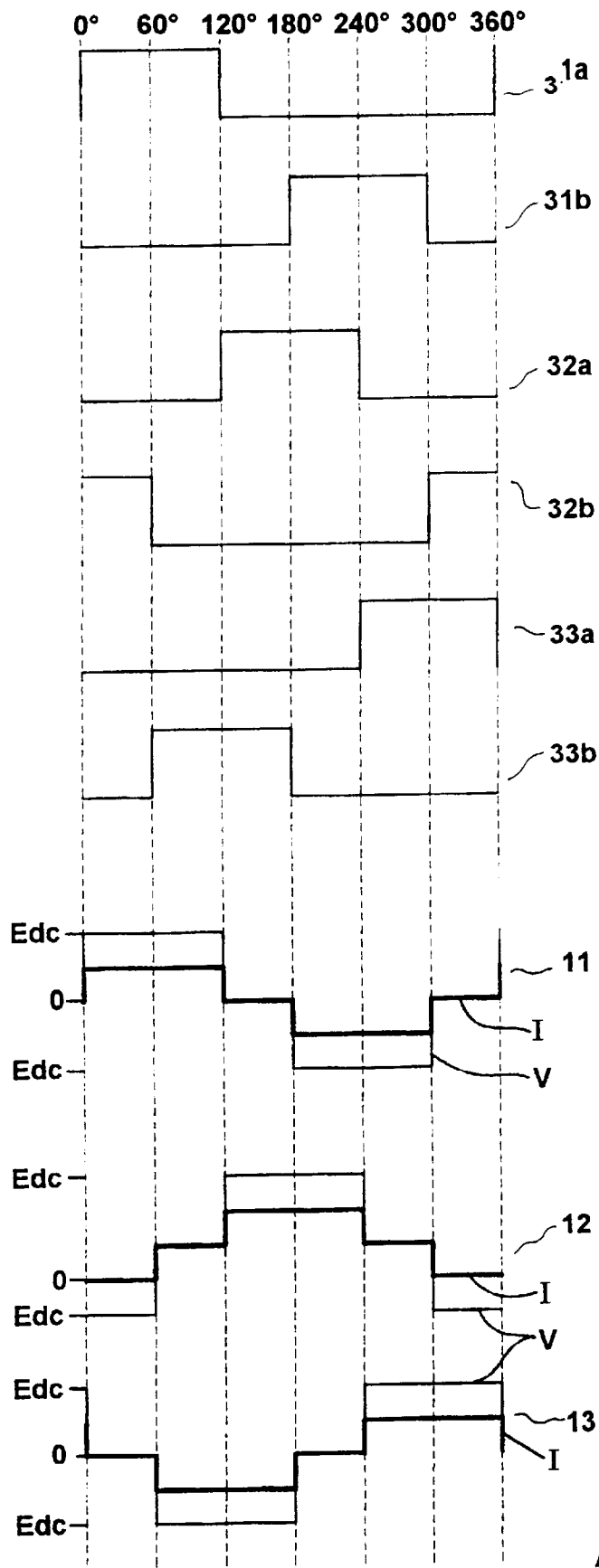
FIG. 4 illustrates, schematically, a graph showing, for one electrical turn of the motor, the voltage and current variation for each motor phase, as a function of the control signals of each commutation arm of the inverter constructed according to the prior art.

According to the prior art and as illustrated in FIGS. 2–4, the inverter 30 is provided with commutation arms 31, 32 and 33, each including switch means in the form of a first and a second commutation switch 31a and 31b, 32a and 32b, 33a and 33b, and having opposite ends connected to the power source 20, the switching of said switch means being commanded by the control unit 40, as a function of the signals received from the position sensor means 50.

Each first commutation switch 31a, 32a and 33a has a respective terminal, connectable to a positive terminal 21 of the power source 20, each of the second commutation switches 31b, 32b and 33b having a terminal connected to a negative terminal 22 of the power source 20.

Between each first and second commutation switch of each commutation arm 31, 32 and 33 of the inverter 30 is connected, respectively and electrically, a terminal of one of the coils, 11, 12 and 13 of the electric motor 10, so that, at each closing of a first commutation switch 31a, 32a and 33a of the inverter 30, a corresponding coil 11, 12 and 13 of the electric motor 10 is electrically connected to a positive terminal of the power source 20 and, analogically, at each closing of a second commutation switch 31b, 32b and 33b of the inverter 30, a corresponding coil 11, 12 and 13 of the electric motor 10 is electrically connected to a negative terminal of the power source 20.

For this embodiment, the power source 20 comprises a ripple filter capacitor 23 and a rectifying diode bridge 24, having a pair of terminals connected to a conventional alternated current source Vac. The power source 20 has its positive and negative poles respectively and selectively connected to the first and second commutation switches 31a, 31b, 32a, 32b and 33a, 33b of each commutation arm 31, 32 and 33, in order to supply the electric motor 10 with a continuous voltage Edc.

The position sensor means 50 which forms the driving system of the electric motor in question detects the voltages induced to each of the three coils 11, 12 and 13 of the motor and sends this information to the control unit 40 which, as a function of said information, of the average current and voltage values and of a reference speed value, sends command signals to the inverter 30 so that, through the latter, each two coils 11, 12 and 13 of the electric motor 10 may be sequentially energized in a determined instant and by a determined time interval defined as a function of the speed and load (torque) of the motor. The energization of the coils occurs in pairs.

Figure 4A:
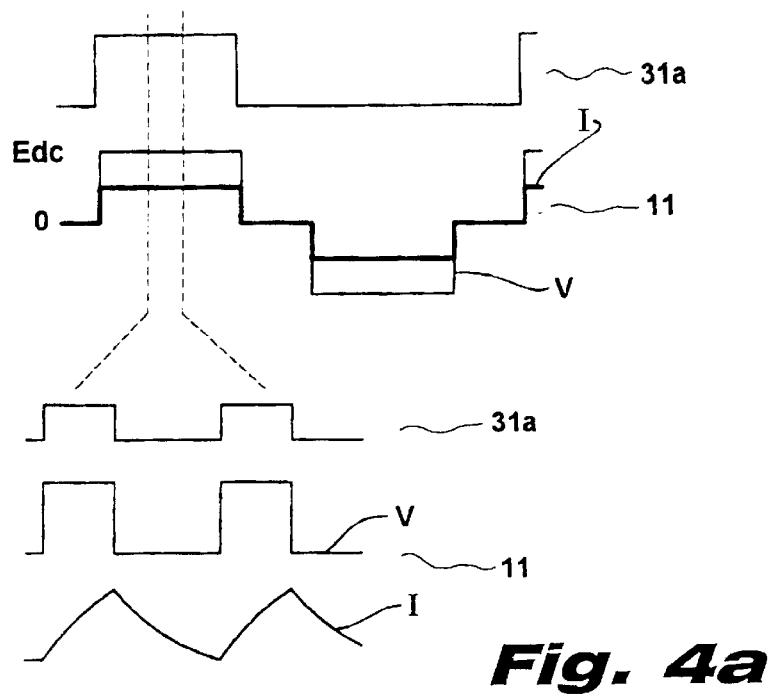
FIG. 4a illustrates, schematically and in an enlarged view, part of FIG. 4, showing the switching frequency.
Figure 5:
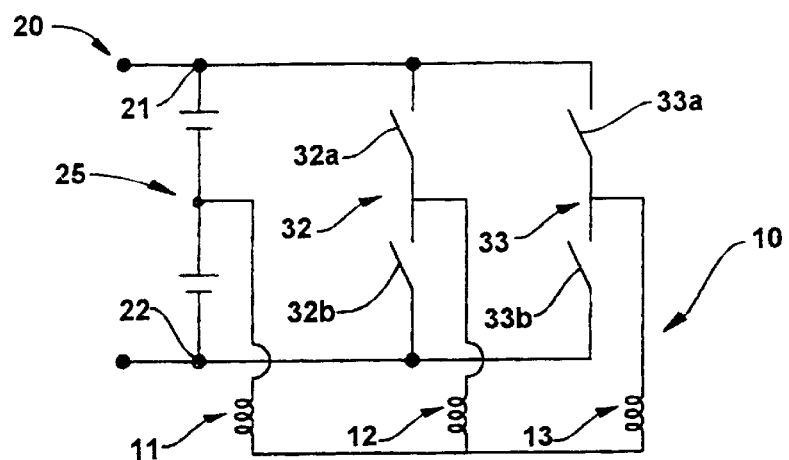
FIG. 5 illustrates, schematically, a construction of the three-phase inverter of the present invention, operatively connecting its commutation arms to the motor phases.
Figure 6:
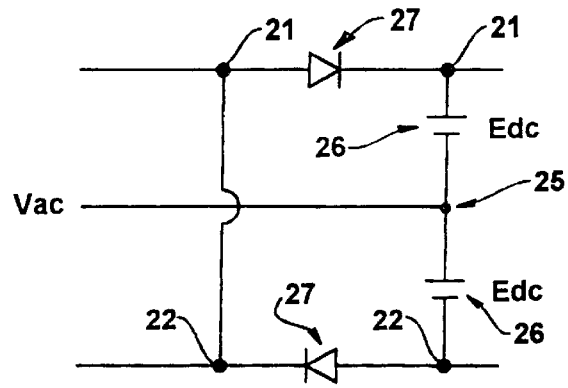
FIG. 6 illustrates, schematically, a construction of a DC power source of the inverter of the present invention.

According to this construction, at each turn of the electric motor 10, each of the 6 commutation switches of the inverter 30 is switched and maintained in a switching condition during a time corresponding to 120° of the electric cycle of the motor (FIGS. 4 and 4a), said switching being instructed by the control unit 40, so that the period in which a first commutation switch of one of the commutation arms is switched corresponds to half the period in which two other second commutation switches are switched, each switch belonging to one of the other two commutation arms, thus determining that, in the period in which each of the commutation switches is switched, one of the coils of the electric motor 10 be fed through the positive terminal of the power source 20, during a time interval corresponding to 120° of the electric cycle of the motor, while in this time interval the other coils are sequentially and temporarily fed through the negative terminal of the power source 20. To give an example, when the first commutation switch 31a is being switched, the first coil 11 of the electric motor 10 will be fed with a certain positive voltage from the power source 20 (Edc/2). While this first commutation switch 31a is being switched (during 120° of the electric cycle of the motor), one of the second commutation switches 32b and 33b, for instance the second commutation switch 32b, will remain switched during a time interval corresponding to 60° of the electric cycle of the motor, from the beginning of the switching of the first commutation switch 31a, allowing the coil 12 of the electric motor 10 to receive a certain negative voltage from the power source 20 (−Edc/2). During this time interval, voltage is fed to the motor circuit, corresponding to Edc, between the positive and negative terminals of the power source.

The first and second switches 33a and 33b of the commutation arm 33 connected to the coil 13 remain open during this time interval and consequently this coil is not fed with voltage from the power source 20.

After the time interval corresponding to 60° of the electric cycle of the electric motor 10 has elapsed, the control unit 40 instructs the opening of the second commutation switch 32b and the instantenous start of the switching of the second commutation switch 33b, disconnecting the coil 12 of the electric motor 10 from the power source 20 and allowing the coil 13 to be fed with the certain negative voltage (−Ecd/2) from the power source 20.

After the time interval corresponding to 120° of the electric cycle of the electric motor has elapsed and during which the first commutation switch 31a was being switched, the control unit 40 instructs the opening of said switch and the switching of the first commutation switch 32a, allowing the coil 12 to be fed with the certain positive voltage Edc/2 from the power source 20. Similarly, the second commutation switches 33b and 31b will be each sequentially switched by time intervals corresponding to 60° of the motor turn.

With this construction, each coil 11, 12 and 13 of the electric motor 10 has a graphic behavior, such as illustrated in FIG. 4, having a switching period Tch during ⅔ of the time interval (or of the electric cycle of the motor) of operation in said voltage of the power source 20 and during which said coils are subjected, during a time interval in which the respective commutation switch is closed (Ton), to a voltage value Edc (positive or negative) equal to that of the power source 20, intercalated with time intervals in which the voltage is null (Toff).

During the time in which each coil 11, 12 and 13 of the electric motor 10 operates in the voltage of the power source 20, the control unit 40 instructs the first and second commutation switches, which have to be switched by 120°, to continuously and instantenously alternate said switching, so that the effective switching voltage applied to the coils associated with these commutation switches is that corresponding to the speed and torque required for the motor. This switching frequency (1/Tch) is fixed and defined in the project phase, while the switch conduction period (Ton/Tch) within the switching frequency is adjusted as a function of the requirement for altering the operational speed and torque of the electric motor 10.

The switch conduction period is defined by the ratio between the time period in which each first and second commutation switch remains connected to the power source 20 and the full switching time, said conduction period being constant during this switching period. This relation is only altered after each electric cycle of the motor has been completed, preventing speed alterations required during each motor turn from being effected.

According to the present invention, the inverter 30 is constructed in order to have a first and a second closing condition of its switch means, for each of said switches the control unit 40 determining a conduction period within the switching frequency, as a function of the requirement for speed and torque of the electric motor 10, each conduction period of the switching frequency defining a determined voltage to be applied to the coils (phases) electrically connected to a power source 20, constructed to operate with the inverter 30 of the present invention.

The poswer source 20 of the present invention has, between the positive terminal 21 and the negative terminal 22 with the same voltage 2Edc, a median terminal 25, of null voltage, to which is directly connected a first pair of coils 11.

For this construction, the power source 20 comprises a pair of capacitors 26, ripple capacitors with the same value Edc, disposed in series between the positive 21 and negative 22 terminals thereof, a median terminal 25 being defined therebetween. The power source 20 further includes voltage rectifying means having a pair of terminals connected to a conventional alternated current source Vac, so that to supply the motor 10, through inverter 30, with different voltage values: 0, +Edc, −Edc, +2Edc, −2Edc, as described below.

In the construction of the present invention, the inverter 30 comprises N−1 commutation arms, each being medianly connected, between the respective switch means thereof, with a corresponding coil of the electric motor 10. The inverter 30 thus constructed has a first and second switching condition of the switch means of its N−1 commutation arms.

In the first switching condition, each two coils, other than the first coil 11, are subjected to a determined voltage value (2Edc), while the first coil 11 and the other coils not connected to the power source 20, are subjected to a null voltage. In the second switching condition, either of the N−1 coils and also the first coil are subjected to a voltage value equivalent to half the determined voltage value (Edc) corresponding to the nominal operational voltage of the motor, while the other coils are subjected to a null voltage. The control unit 40 further determines that, as a function of occuring the first swiching condition, there is a reduction in the switch conduction period by a value which results in the coils being energized with the nominal voltage.

According to the present invention and as illustrated in FIGS. 5–7A, the inverter 30 has two commutation arms 32, 33, each provided with a pair of commutation switches comprising a first and a second commutation switch 32a, 32b, 33a, 33b.

According to the present invention, in the first switching condition of the inverter 30, a first commutation switch of one of the the commutation arms is connected to the positive terminal 21 of the power source, while a second commutation switch of another commutation arm is simultaneously connected to the negative terminal 22 of the power source 20. In this condition, the coils connected to these commutation arms are submitted to a voltage value of 2Edc, each of said coils being individually submitted to a voltage value whose module is equal to Edc, while the first coil is submitted to a null voltage value.

In the second switching condition of the inverter 30, any one of the first and second commutation switches of one of the commutation arms is individually connected to one of the positive 21 and negative 22 terminals of the power source 20, so that the coils of one motor phase and the coils of the first chase are submitted to a voltage value corresponding to Edc. In this condition, each of the coils of one motor phase is individually submitted to a voltage value with a module equal to Edc/2.

According to the illustration in the second condition, to each closing of a first switch 32a, 33a of the inverter 30, a corresponding coil 12, 13 of the electric motor 10 is electrically connected to the positive terminal 21 of the power source 20, in order to be fed by the latter through the first coil 11 with a voltage value Edc on the coils, during a time interval corresponding to a rotation of 60° of the electric motor 10. During the closing of any of the first commutation switches 32a, 33a, each respective coil 12, 13 and the first coil 11 of the electric motor 10 are individually supplied with a continuous voltage Edc/2 e−Edc/2, respectively.

The same occurs when one of the second switches 32b and 33b of the inverter is closed, individually, but with an inverted voltage value.

The supply of the first coil 11 will depend on the supply of one of the first and second commutation switches of one of the commutation arms 31, 32 of the inverter 30.

According to this construction, in each electric cycle of the electric motor 10, each of the four commutation switches 32a, 32b, 33a and 33b of the inverter 30 is switched and maintained in a switching condition, during a time corresponding to 120° of the electric cycle of the motor (FIGS. 7 and 7a), said switching being instructed by the control unit 40, so that the period in which one of the first commutation switches 32a, 33a of one of the commutation arms 32, 33 is switched corresponds to half the period in which the second commutation switch of the other commutation arm is switched, thus determining that one of the coils 12 an 13 of the electric motor 10 be fed through one of the positive 21 and negative 22 terminals of the power source 20, during a time interval corresponding to 60° of the electric cycle of the motor, while, in said time interval, the first coil 11 remains temporarily subjected to a null voltage value.

To give an example, when the first switch 32a of the second commutation arm 32 is closed, the coil 12 connected to this commutation arm 32 is being fed by the positive terminal 21 of the power source 20. While this first commutation switch 32a is being switched (during 120° of the electric cycle of the motor), the second commutation switch 33b will remain switched during a time interval corresponding to 60° of the motor rotation, from the closing of the first commutation switch 32a, allowing the pair of coils 13 connected to this third commutation arm 33 to receive a negative voltage from the power source 20. In this period, the electric motor 10 is fed with a voltage of 2Edc (first operational condition).

After the time interval corresponding to 60° of the electric cycle of the electric motor 10 has elapsed, the control unit 40 instructs the opening of the second commutation switch 32b. This disconnection leads the coil 12 to a feeding condition of Edc/2 and the first coil 11 to a feeding condition of –Edc/2 by the power source 20.

After the time interval corresponding to 120° of the electric cycle of the electric motor 10 has elapsed and during which the first commutation switch 32a was being switched, the control unit 40 instructs the opening of said switch and the switching of the third commutation switch 33a, during a time interval of 120° of the electric cycle of the motor, allowing the respective coil 13 to be fed with positive voltage from the power source 20, through the first coil 11, in the first 60° of the electric cycle of the motor, with the electric motor 10 being supplied with Edc. Similarly, the second commutation switch 32b will be switched during a time interval corresponding to 60° of the electric cycle of the motor. However, this fact does not occur now in the first 60° of the 120° of the electric cycle of the motor in which the switch 33a is switched, but in the final 60° of this cycle (repeating the first operational condition).

Figure 7:
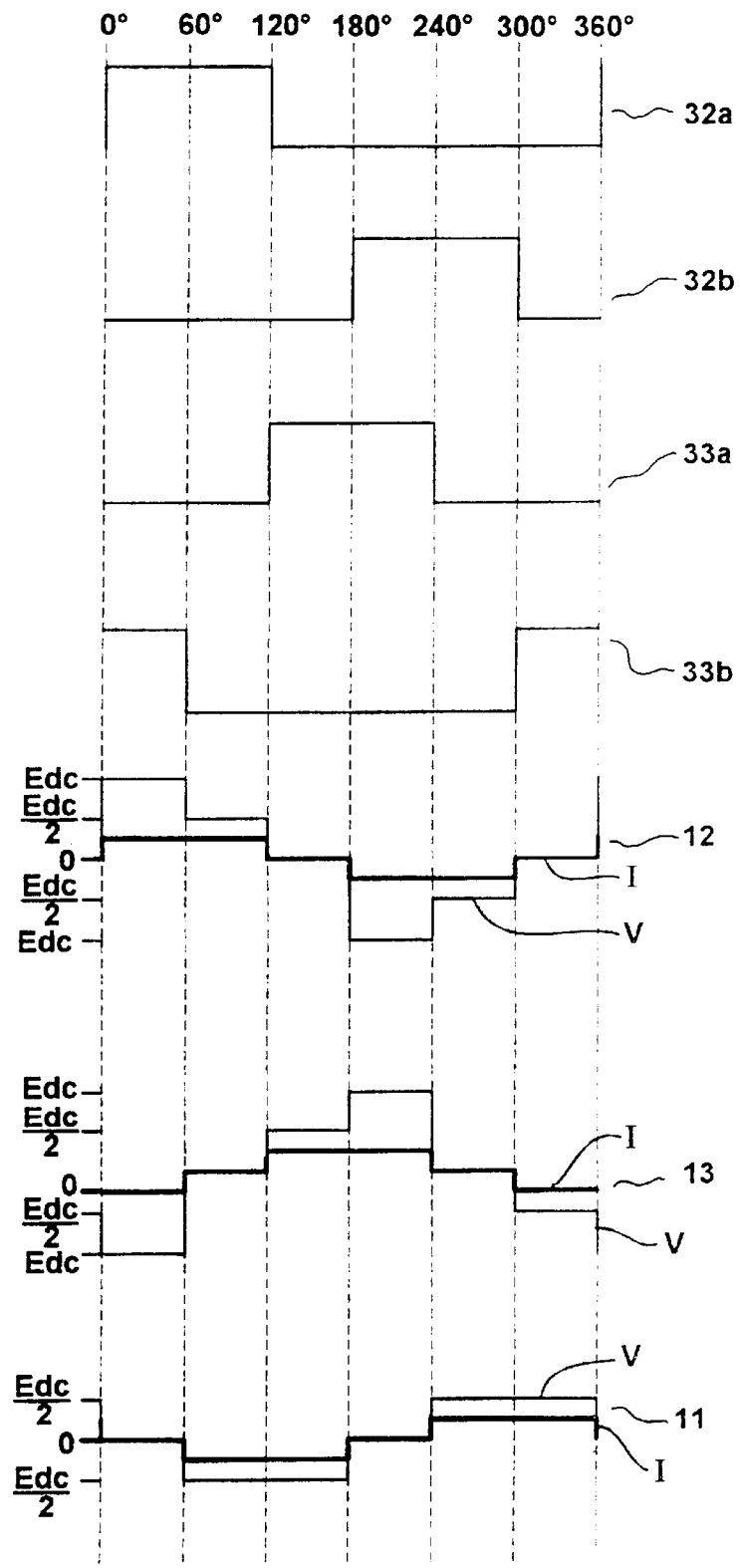
FIG. 7 illustrates, schematically, a graph showing, for one electrical turn of the motor, the voltage and current variation for each motor phase, as a function of the control signals of each commutation arm of the inverter constructed according to the present invention.
Figure 7A:
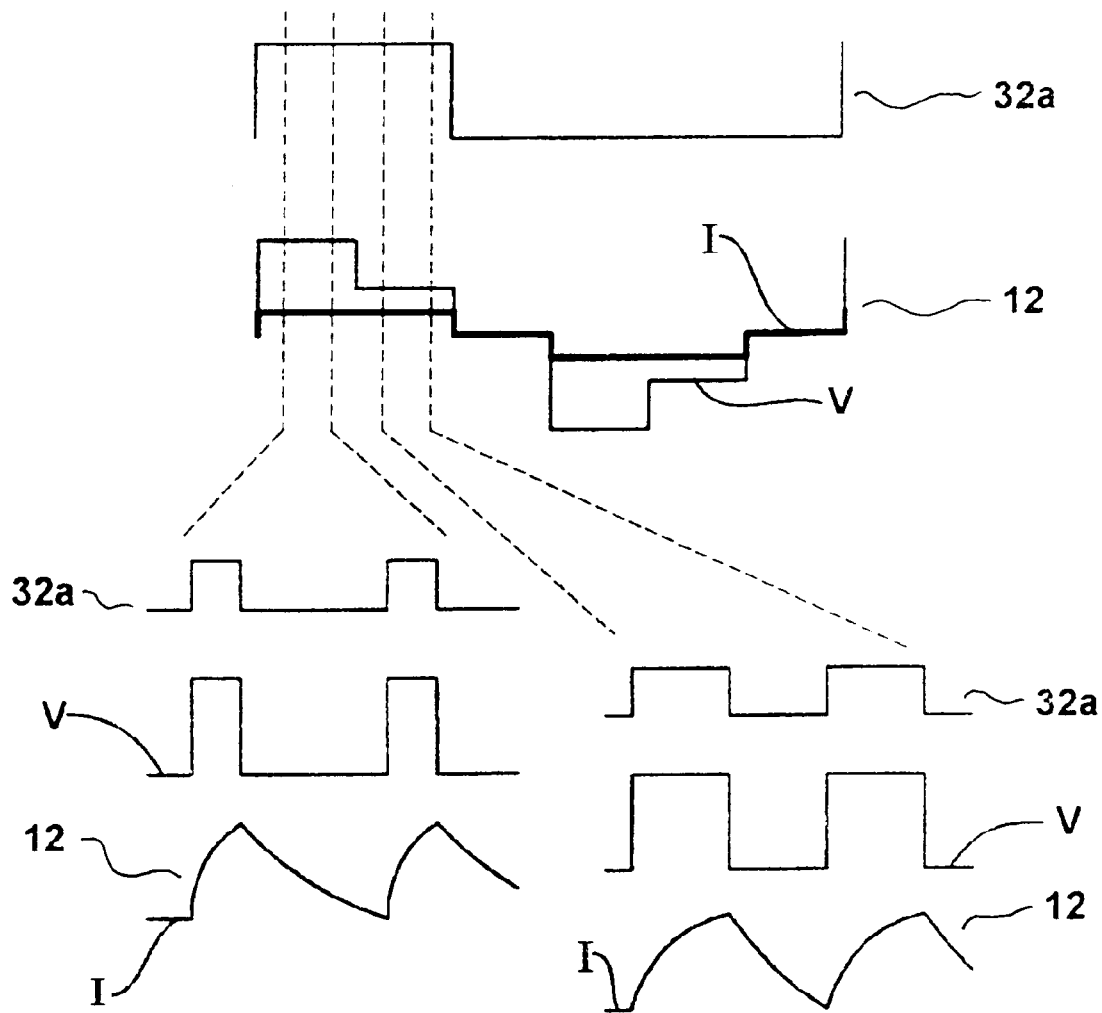
FIG. 7a, illustrates, schematically and in an enlarged view, part of FIG. 7 showing the switching frequency.

With this construction, each coil 12, 13 of the electric motor 10 has a graphic behavior as illustrated in FIGS. 7 and 7a, with an operational period submitted to a voltage value (positive or negative) equal to Edc, intercalated, in a staggered manner, with periods of Edc/2 and null voltages, each time period with a determined voltage having a duration corresponding to 60° of the electric cycle of the electric motor 10.

Such as it occurs in the prior art, the driving of the electric motor 10 requires detecting the position of said motor, in order that the control unit 40 determines which coil or coils of the electric motor 10 will be switched at each time. In the present construction, also the torque control can be made by current hysteresis or by controlling the voltage applied to the motor.

In the control by hysteresis, only the coils 12 and 13 connected to the two commutation arms 32, 33 of the inverter 30 are controlled by isolated current sensors.

In the voltage control, the implementation of the control system is simplified, since it requires the current to be applied only to the two coils of the electric motor 10 which are connected to the two commutation arms of the inverter 30. As in the prior art, the voltage which is applied is modulated by a modulating signal (PWM) generated by a timer, the average value thereof being adjusted by the control unit 40 to maintain a constant speed. Thus, if the actual rotational speed of the motor is lower than the desired speed, the control unit 40 will instruct to increase the voltage. In the case the actual speed is higher than the one desired, the control unit 40 will instruct to reduce the voltage applied to the motor. This voltage variation is adjusted by modifying the value of the switch conduction period, since an increase or a reduction of said value will mean, respectively, an increase of the voltage value and a reduction of said voltage value in the electric motor 10.

With the construction of the present invention, distinct forms of voltage in the three coils 11, 12 and 13 of the electric motor 10 are obtained. To avoid that these differences cause unbalance among the currents in these phases, with reflex in the torque, the present invention makes possible to alter the switch conduction period, with instruction of the control unit 40, be altered, having its value reduced to half, when the peak voltage value in the electric motor 10 reaches a value 2Edc, returning said switch conduction period to its value determined as normal, when the peak voltage value in the motor is reduced to half, i.e., is equal to Edc. Thus, it is possible to keep constant the average voltage value, and to keep the currents balanced and the instantaneous torque constant. In order to obtain this balance, the control unit 40 should instruct to reduce the value of the switch conduction period to half, for each electric cycle of the electric motor 10, during the time intervals corresponding to the following angular intervals of said electric circuit: 0° to 60° and 180° to 240°(first operational condition), returning the value of the switch conduction period to its normal value during the time intervals corresponding to the following angular intervals: 60° to 180° and 240° and 240° to 360°(second closing condition).

In order to avoid an increase in the current ripple that may occur during the time intervals corresponding to the following angular intervals of the electric cycle of the motor: 0° a 60° and 180° to 240°, due to peak voltage increase in the motor, the control unit 40 may further determine, in these conditions, to occur an increase in the switching frequency of the electric motor 10.

What is claimed is:

1. A driving control system for electric motors with N coils, N being at least three, including: a power source (20) in direct current; an inverter (30) having commutation arms with the opposite ends connected to the power source and each including switch means, each commutation arm being medianly connected to a respective coil; a position sensor means (50) connected to the coils; and a control unit (40), operatively connected to the position sensor means (50) and to the switch means, in order to operate the latter as a function of the signals received from the position sensor means (50), characterized in that the inverter (30) has N–1 commutation arms and the power source (20) has, between positive (21) and negative (22) terminals of equal voltage, a median terminal (25), of null voltage, to which is directly connected a first coil (11) of the electric motor (10), the inverter (30) having a first switching condition of the switch means, in which the first coil (11) is subjected to a null voltage, while two other coils are subjected to a determined voltage value, and a second switching condition of the switch means, in which the first coil (11) and any of said other coils are subjected to a voltage value equivalent to half the determined voltage value and corresponding to the nominal voltage, the control unit (40) determining to the switch means, the latter being in one of the first and second switching conditions, a switching frequency and a switch conduction period, which are defined so that the voltage value which is effectively applied to the coils is that one corresponding to the speed and torque required to the electric motor (10), independently from the switching condition of the switch means.

2. A driving control system, as in claim 1, characterized in that the control unit (40) determines, as a function of occurring the first switching condition, a reduction in the switch conduction period which subjects the energized coils to the nominal voltage value.

3. A driving control system, as in claim 2, characterized in that the reduction in the switch conduction period, upon occurring the first switching condition, is equal to half the value of the switch conduction period in the second switching condition, during 60° of the electric cycle of the electric motor (10).

4. A driving control system, as in claim 1, characterized in that, in the first switching condition, it occurs, simultaneously, the connection of each of the two coils to a respective positive terminal (21) and negative terminal (22) of the power source (20) and, in the second switching condition, occurring, individually, the connection of any coil to one of the positive (21) and negative (22) terminals of the power source (20).

5. A driving control system, as in claim 4, characterized in that the switch means of each commutation arm (32, 33) includes a pair of commutation switches (32a, 32b, 33a, 33b), one of which having a terminal connectable to the positive terminal (21) of the power source (20), while the other commutation switch has a terminal connected to the negative terminal (22) of the power source (20).

6. A driving control system, as in claim 5, characterized in that, in the first switching condition, the switching of the commutation switches (32a, 32b, 33a, 33b) in distinct commutation arms (32, 33) provides the connection of the respective coils (12, 13), respectively, to the positive terminal (21) and to the negative terminal (22) of the power source (20) and, in the second switching condition, the individual switching of one of the commutation switches (32a, 32b, 33a, 33b) of each commutation arm (32, 33) provides the connection of the respective coil (12, 13) to one of the positive (21) and negative (22) terminals of the power source (20).

7. A driving control system, as in claim 1, characterized in that the power source (20) includes, between its positive (21) and negative (22) terminals, a pair of capacitors (26), which are disposed in series and between which is defined a median terminal (25) of null voltage.

8. A driving control system, as in claim 7, characterized in that the power source (20) further includes voltage rectifying means (27) connected to the pair of capacitors (26).

9. A driving control system, as in claim 8, characterized in that the voltage to each of the N−1 coils varies, in a staggered manner, between positive and negative voltage values at each 60° of the electric cycle of the motor.

10. A driving control system, as in claim 9, characterized in that the conditions of supplying positive voltage and negative voltage to the first coil (11) are altered after 120° of the electric cycle of the motor.

11. A driving control system, as in claim 1, characterized in that the control unit (40) determines, upon occurring the first switching condition, an increase of the switching frequency, in order to avoid an increase of the current ripple in the electric motor (10).

* * * * *